United States Patent Office 3,522,160
Patented July 28, 1970

3,522,160
PROCESS FOR THE PRODUCTION OF ADDITION PRODUCTS OF DERIVATIVES OF MALEIC ACID AND ACETYLENE
Gunther Otto Schenck, Gunther Koltzenburg, and Peter Gottfried Fuss, Mulheim (Ruhr), Germany, assignors to Studiengesellschaft Kohle m.b.H., a corporation
No Drawing. Filed Dec. 28, 1966, Ser. No. 605,158
Claims priority, application Germany, Jan. 3, 1966, St 24,836, St 24,837; June 10, 1966, St 25,521
Int. Cl. B01j 1/10
U.S. Cl. 204—162
9 Claims

ABSTRACT OF THE DISCLOSURE

The reaction of maleic anhydride, maleic acid imide and or N-substituted maleic acid imides with an acetylene, in the presence of light and a solvent preferably at temperatures below 10° C. and preferably in the presence of a sensitizer to produce products of the formula:

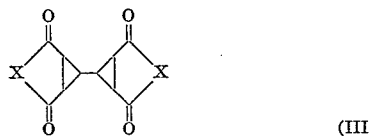

(III)

wherein X is oxygen, nitrogen, or alkyl substituted nitrogen.

---

This invention relates to a process for the preparation of addition products of derivatives of maleic acid and acetylene, more particularly to a photochemical process for the preparation of 1:1- and/or 2:1-addition products of acetylene and maleic acid derivatives of the formula

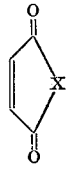

(I)

wherein X is oxygen or the group NR (R=H or alkyl, especially lower alkyl having preferably 1 or 2 carbon atoms).

The photosensitized addition of maleic anhydride to acetylene derivatives and that of substitution products of maleic anhydride to acetylene to form 1:1 adducts which are cyclobutene derivatives is known. These two reaction types are illustrated by the following reaction equations:

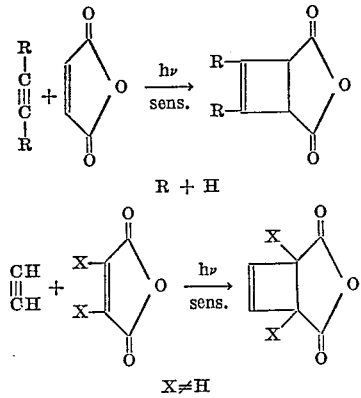

However, the photosensitized addition of acetylene to maleic anhydride or the corresponding maleic acid imide compounds has not been described up to the present.

According to the reactions described above, one might have expected that the photosensitized additions of acetylene to maleic acid derivatives of the Formula I under the corresponding process conditions lead to cyclobutene derivatives of the general Formula II:

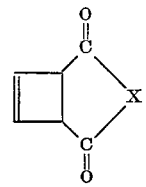

(II)

However, it has been found surprisingly that the novel compound III of the formula

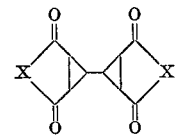

(III)

is formed under these process conditions as the main product while the compound II is produced in a substantially insignificant amount. For example, when starting from maleic anhydride, the 2:1 adduct of the Formula IV

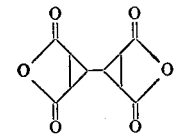

(IV)

is obtained in high yields (85% of the theoretical, based on maleic anhydride consumed) in place of the expected 1:1 adduct. However, if high yields of the compound II are desired in the process of the invention, it is necessary to use substantially lower temperatures as compared with the prior art and/or a high excess of acetylene. Therefore, an essential characteristic of the invention resides in the fact that it is possible to guide the addition reaction between the maleic acid derivative and acetylene in such a manner that the relative proportions of 2:1- and 1:1-adducts produced are controlled. Finally, a further characteristic of the invention relates to the increase in conversion obtained in the process.

Accordingly, it is an object of the invention to provide a process for the production of 1:1- and/or 2:1-addition products of alkyne compounds and maleic acid derivatives of the Formula I:

(I)

wherein X is oxygen or the group >NR(R=H or alkyl, especially lower alkyl having preferably 1 or 2 carbon atoms), the process comprising reacting the maleic acid derivative and acetylene in the presence of solvents under the conditions of the photosensitized co-cyclo-addition while controlling the relative proportions of the resultant 1:1- and 2:1-addition products by the selection of the operating conditions, especially the temperature and/or the feed rates of reactants.

The operating temperature is of great importance for the new process. While it is entirely possible to use normal temperature, it appears that this results readily in the formation of yellow to brown by-products which, probably by internal light filter effects, cause the photochemical reaction to succumb soon.

Accordingly, it may be particularly preferred in accordance with the invention to operate at temperatures below room temperature because this permits surprisingly the suppression of this undesirable phenomenon. Thus, it is possible with the use of increasingly lower temperatures to increase the conversion to as high as 80% and more of the maleic acid derivative charged.

However, the process temperature may also have a decisive effect on the relative proportions of the adducts (II) and (III) formed. This becomes obvious, for example, when operating with acetylene-saturated reaction mixtures and the same amounts of maleic anhydride but at different temperatures. For example, if the reaction mixture chosen leads predominantly to 2:1 adducts when using room temperature (see Example 1), then the proportion of 1:1 adduct produced increases as the operating temperature decreases so that it is possible to obtain as much as 85% and more of 1:1 adducts in addition to only small amounts of 2:1 adducts.

Good results in the process are obtained especially at temperatures below 10° C. and preferably below 0° C. The use of temperatures of as low as −40 to −50° C. may be desirable.

The formation of the 1:1 adduct (II) and consequently the 2:1 adduct (III) may also be influenced by the selection of the relative proportions of the reactants, i.e. maleic acid derivative and acetylene. Thus, it is possible to favor the formation of the 2:1 adduct (III) by using comparatively higher amounts of the maleic acid derivative.

The sensitizers used are those of the type benzophenone, acetophenone, propiophenone and/or substitution products thereof which are known to be sensitizers. Substitution products which may be used are compounds which are substituted in the aromatic ring by halogen, lower alkyl groups, especially methyl and phenyl groups. Lower aliphatic ketones having not more than two carbon atoms in each side chain are also suitable.

Any conventional solvent which is inert to maleic anhydride and does not bear hydrocarbon double bonds may be used as the solvent. Preferred solvents are lower aliphatic ketones having not more than 2 carbon atoms in each side chain such as acetone and methyl ethyl ketone; hydrocarbons such as hexane; chlorinated hydrocarbons such as methylene chloride, chloroform, carbon tetrachloride, and the chlorinated ethanes and the Frigenes; acid anhydrides such as acetic anhydride; esters such as acetic acid ester and butyl acetate; dimethyl formamide and dimethyl sulfoxide, these solvents being used either alone or in mixture. Preferred of these solvents is acetone.

The reaction solution is irradiated during the reaction with light having preferably a wave length smaller than 400 nanometers.

The structure of the 2:1 adduct (IV) mentioned above, i.e. bis-3,3'-(cyclopropane-1,2 - dicarboxylic anhydride) which has a melting point of 245 to 256° C. (d.) has been established by means of the analysis, the molecular weight and the IR, UR and NMR spectra.

Moreover, it has been found that the compound (IV) consists of a mixture of different stereoisomers. Thus, for example, esterification of (IV) with methanol/H₂SO₄ gives a mixture of two tetramethyl esters (TA 1, melting point 168 to 171° C., and TA 2, melting point 155° C.) which, for example, can be separated by chromatography on silicagel. When subjecting the ester TA 1 to chromatography on silicagel, it is isomerized to a small extent to form a tetramethyl ester TA 3 having a melting point of 148° C.

The UV, IR, NMR and mass spectra of the esters TA 1, TA 2 and TA 3 and their stability to KMnO₄/acetone and Br₂/CHCl₃ show that they are to be considered as bis-3,3'-cyclopropane-1,2-dicarboxylic acid dimethyl ester).

The ester TA 1 has the structural formula

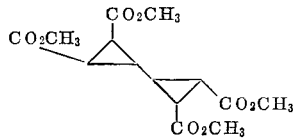

F. P. 169–171° C. (crystallized from CH₃CH)

After thorough analysis of the NMR spectrum, the following constitution is to be assigned to the TA 2 ester:

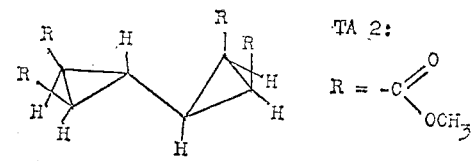

The ester TA 3 has the following structural formula:

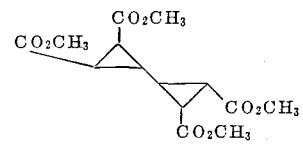

F. P. 148° C. (crystallized from CH₃OH)

The esters TA 1 and TA 2 were converted by known methods via the tetracarboxylic acids into the tetracarboxylic acid-bis-anhydrides IVa and IVb:

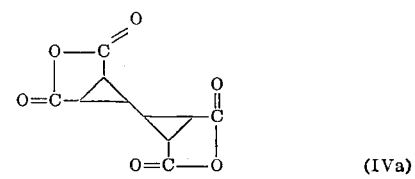

M.P. 314° C. (crystallized from CH₃NO₂) (d.)

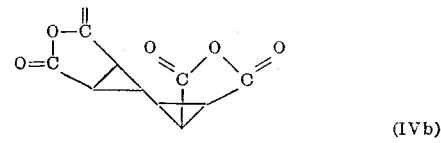

M.P. 293–294° C. (crystallized from CH₃NO₂)(d.)

Comparison of the NMR spectra furnished evidence that the anhydride mixture obtained contained only these two of the three conceivable stereoisomers.

The tetramethyl ester TA 3 was converted in an analogous manner into the tetracarboxylic monoanhydride of the Formula IVc:

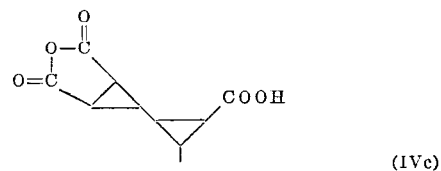

M.P. 347° C. (d.)

Boiling of the ester mixture TA 1 and TA 2 for 70 hours with two times the molar amount of NaOCH₃ in methanol, subsequent slight acidification with somewhat more than the equivalent amount of glacial acetic acid, evaporation, taking up with water, extraction with chloroform, drying over calcium chloride, evaporation and chromatography on SiO₂/CHCl₃ gave further two stereoisomeric tetramethyl esters in a ratio of about 10:1, viz TA 4 melting at 121–123° C. (rearrangement, further melting point 135–140° C.) and TA 5 melting at 87–88° C., both of these esters being uniform as determined by thin layer chromatography. Their structural formulae (meso-form and racemic form) can be assumed to be

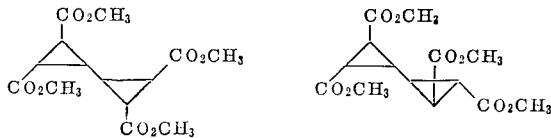

The anhydrides IIa and IIb were also converted by known methods into the corresponding bis-N-ethylimides having the formulae (Xc1) and (Xc2) (see Example 5):

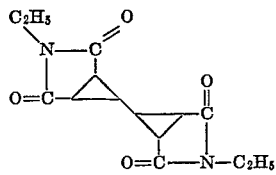

(Xc1)

M.P. 286–288° C. (crystallized from CH₃OH)

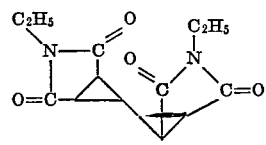

(Xc2)

M.P. 218–220° C. (crystallized from CH₃OH)

The compound (III) is highly reactive. For example, the compound (IV) undergoes a change in dimethyl sulfoxide already when allowing to stand at room temperature. Otherwise it shows the reactions to be expected for a saturated bis-anhydride.

One of the most important embodiments of the invention is the reaction of maleic anhydride with acetylene. For example, cyclobutene-3,4-dicarboxylic anhydride (V) can be obtained from inexpensive raw materials by a clean-cut procedure. The compound (V) is a useful starting product of a great number of commercially important substances.

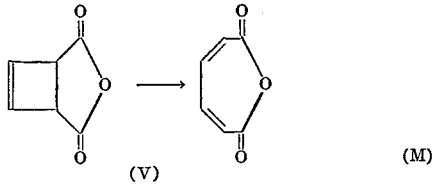

For example, the compound (V) can be partially isomerized to form muconic anhydride (M). The esters of the compound (I) can be smoothly isomerized to form muconic acid esters. The hydrogenated methyl ester of (I) can be isomerized to form dihydromuconic acid dimethyl ester which, similar to the muconic acid ester, can be hydrogenated to form the adipate. The compound (V) polymerizes when heated to 120° C. Reaction of the compound (V) with water gives the novel compound (Va) which in turn can be converted into cis, trans-muconic acid (Vb) by treatment with water at high temperatures. The reaction may also be carried out so as to proceed from (V) directly to (Vb):

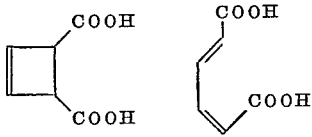

(Melting point 124–125° C.)

(Va)    (Vb)

To be mentioned in this connection are also the reactions of the invention which surprisingly occur at the olefinic unsaturation of the compound (II) and (V), respectively. The reaction of the maleic acid derivative (I) with the compound (II) under the conditions of the photosensitized co-cycloaddition gives a compound of the general Formula VI:

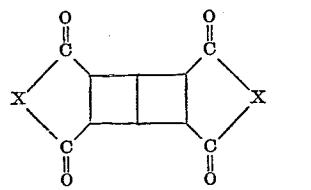

(VI)

rather than the expected compound (III).

For example, reaction of maleic anhydride with the compound (V) gives bicyclo[2,2,0]hexane-2,3,5,6-tetracarboxylic dianhydride having the structural Formula VII

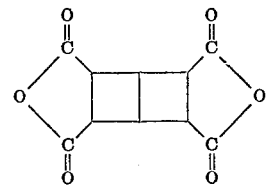

(VII)

having a melting point of 335–338° C. The structure of the compound was determined from molecular weight determination, analysis, UV, IR and NMR spectra.

In a corresponding manner, the compound (VIII) having the formula

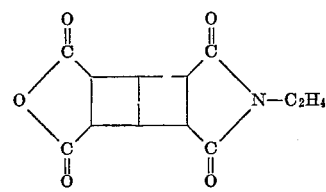

(VIII)

was prepared by the photosentized cycloaddition of both maleic anhydride to the compound (IXc) (melting point 82–84° C.) mentioned hereafter and prepared in accordance with the invention and of N-ethyl maleimide to the compound (V). Both of these reactions give the same sterically uniform substance (VIII) which has a melting point of 245–247° C. (d.) and the structure of which was established in the same manner as in case of the other compounds mentioned above.

However, as is obvious already from the above statements, the process of the invention is not restricted thereto but is also applicable to the reaction of acetylene with maleimide and the N-substituted maleimides. The preferred N-substituents are lower alkyl groups, especially the methyl group and ethyl group. The 1:2 product of maleic imide and acetylene has been found to be polymeric. Thus, the general principles of the invention are applicable to both maleic anhydride and maleic acid derivatives in which the cyclic oxygen atom is replaced by the group NR. Among the particularly preferred amide compounds prepared in accordance with the invention are the 1:1 adducts of the type (IX) and the 1:2 adducts of the type (X).

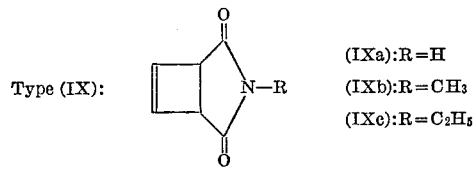

Type (IX):    (IXa):R=H
              (IXb):R=CH₃
              (IXc):R=C₂H₅

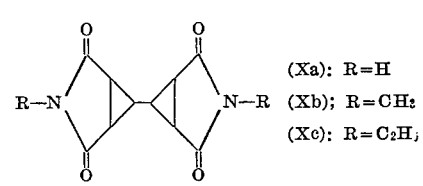

Type (X):    (Xa): R=H
             (Xb): R=CH₃
             (Xc): R=C₂H₅

EXAMPLE 1

A solution of 25 g. maleic anhydride and 10 g. benzophenone in 250 ml. acetone was saturated with acetylene in a water-cooled immersion lamp apparatus of Solidex glass at 12° C. and irradiated for 27.3 hours with the light of a mercury high pressure lamp Philips type HPK of 125 watt. Bis-3,3′-(cyclopropane-1,2-dicarboxylic anhydride) (IV) melting at 246–256° C. (d.) in an amount of 5.02 g. precipitated and was recovered by filtration. The filtrate was largely concentrated under reduced pressure and thereafter poured into about 500 ml. of boiling ether thereby precipitating further 1.85 g. of (IV). The ethereal filtrate was evaporated to a volume of about 80 ml. When allowed to cool, 1.20 g. of the compound (V) crystallized (melting point, 90° C.). Further crystal fractions obtained from the mother liquor contained only starting materials.

The conversion of maleic anhydride could be slightly increased by extended irradiation.

Yield:
6.87 g. of (IV) (86% of the theoretical yield, based on maleic anhydride consumed)
4.20 g. of (V) (14% of the theoretical, based on maleic anhydride consumed)

EXAMPLE 2

A solution of 55 g. maleic anhydride and 20 g. benzophenone in 875 ml. acetone was saturated with acetylene at −46° C. in an immersion lamp apparatus of Solidex glass and irradiated for 67 hours with the light of a mercury high pressure lamp Osram type Hg H 450 W. The procedure described in Example 1 was used for processing. The conversion of maleic anhydride could not be increased by continued irradiation.

Yield:
10.82 g. of (IV) (16 mole-percent of the reaction product)
31.55 g. of (V) (84 mole-percent of the reaction product)

EXAMPLE 3

A solution of 14.55 g. of maleic imide and 9.2 g. of benzophenone in 200 ml. of acetone was saturated with acetylene in a methanol-cooled apparatus of Solidex glass at −50° C. and irradiated for 49.4 hours with the light of a mercury high pressure lamp Philips type HPK of 125 watt at −50° C. Bis - 3,3'-(cyclopropane - 1,2 - dicarboxylic acid imide) (Xa, decomposition beginning at 330° C., polymeric) precipitated and was recovered by filtration in an amount of 4.0 g. The filtrate was largely concentrated. The resultant oil was added with stirring to 400 ml. of boiling ether and kept boiling for 10 minutes. This resulted in additional 3.58 g. of (Xa). The ethereal filtrate was concentrated to a volume of about 60 ml. Upon cooling, 3.45 g. of (IXa) melting at 112–114° C. crystallized. Further crystal fractions of the mother liquor contained only the starting substances.

EXAMPLE 4

A solution of 16.7 g. of N-methyl maleic imide and 10.0 g. of benzophenone in 200 ml. of acetone was saturated with acetylene at −50° C. in a methanol-cooled immersion lamp apparatus of Solidex glass and irradiated for 65 hours with the light of a 125 w. mercury high pressure lamp Philips type HPK at −50° C. Photodimeric N-methyl maleic imide melting at 335–336° C. (d.) precipitated and was recovered by suction filtration in an amount of 4.8 g. The filtrate was evaporated. The oily residue was added with stirring to about 500 ml. of boiling ether and the precipitated bis-3,3'-(cyclopropane-1,2-dicaboxylic-N-methylimide) (5.9 g. of (Xb), melting point 218–230° C. (d.)) recovered by filtration. The ether filtrate was concentrated and subjected to fractional crystallization. The first two fractions gave 2.9 g. of (IXb) (M.P. 74–76° C.). Further fractions contained only the starting substances.

EXAMPLE 5

A solution of 25 g. of N-ethylmaleic imide and 15 g. of benzophenone in 250 ml. of acetone was saturated with acetylene at −50° C. in a methanol-cooled immersion lamp apparatus of Solidex glass and irradiated with the light of a 125 w. mercury high pressure lamp Philips type HPK at −50° C. for 63. 8 hours. Bis-3,3'-(cyclopropane-1,2-dicarboxylic-N-ethylimide) (Xc, M.P. 284–287° C.) was recovered by suction filtration in an amount of 2.25 g. The filtrate was largely concentrated under reduced pressure, poured into about 400 ml. of ether, boiled for 5 minutes and further 2.1 g. of (Xc) were recovered by suction filtration. The filtrate was evaporated and subjected to fractional crystallization. The first three fractions gave a total of 9.6 g. of (IXc) (M.P. 82–84° C.). Further fractions contained only starting materials.

EXAMPLE 6

A suspension of 11.1 g. of bis-3,3'-(cyclopropane-dicarboxylic-1,2-anhydride) and 20 ml. of aniline in 150 ml. of acetone was refluxed for 5 hours and 12.15 g. of precipitated product were recovered by suction filtration. The product was heated for 1½ hours to 100° C. in 60 ml. of acetic anhydride with 3 g. of anhydrous sodium acetate. After cooling, the mixture was added with stirring to 300 ml. of water, cooled within 2 hours to 5–10° C. and subjected to suction filtration. The residue was recrystallized from methanol to give 1.8 g. of bis-3,3'-(cyclopropane - 1,2-dicarboxylic-N-phenylimide) melting at 214° C. This substance is not obtainable by the benzophenone-photosensitized reaction of N-phenylmaleic imide and acetylene in acetone but is prepared by reaction of (IV) and aniline by a process known per se.

What is claimed is:

1. A process for preparing adducts of acetylene and a maleic acid derivative of the formula:

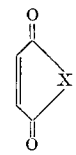

wherein X is a member selected from the group consisting of oxygen and NR, wherein R is hydrogen or alkyl, which process comprises carrying out said reaction in the presence of light a sensitizer and a solvent.

2. A process as claimed in claim 1, comprising directing said reaction toward the formation of a 1:1 adduct of the formula:

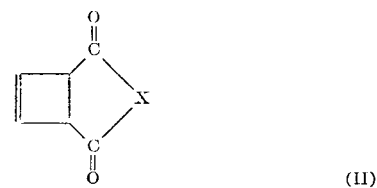

by carrying out said reaction at temperatures below about room temperature.

3. A process as claimed in claim 2, comprising directing said reaction toward the formation of a 1:1 adduct of the formula II by carrying out said reaction with said maleic acid derivatives used in substantially less than stoichiometric quantity.

4. A process as claimed in claim 1, carried out at temperatures below about 10° C.

5. A process as claimed in claim 1, carried out at temperatures of about −40 to −50° C.

6. A process as claimed in claim 1, wherein said light has a wave length of less than 400 nanometers.

7. A process as claimed in claim 1, wherein said solvent is at least one selected from the group consisting of lower aliphatic ketones having up to about 2 carbon atoms in each side chain attached to said ketone group, hydrocarbons, chlorinated hydrocarbons, acid anhydrides, esters, dimethyl formamide, dimethyl sulfoxide, and mixtures thereof.

8. A process as claimed in claim 1, wherein said solvent is acetone.

9. A process as claimed in claim 1, wherein said sensitizer is selected from the group consisting of benzophenone, acetophenone, propiophenone, lower aliphatic ketones having up to about 2 carbon atoms on each side of the carbonyl group thereof.

References Cited

Bryce-Smith et al.: Journal Chem. Soc. (1962), pages 2675–79.

HOWARD S. WILLIAMS, Primary Examiner

U.S. Cl. X.R.

260—326.3, 343, 347.3, 468, 514, 537

UNITED STATES PATENT OFFICE
CERTIFICATE OF CORRECTION

Patent No. 3,522,160     Dated July 28, 1970

Inventor(s)   Gunther Otto Schenck et al.

It is certified that error appears in the above-identified patent and that said Letters Patent are hereby corrected as shown below:

Column 1, after line 28, insert the following:

There are also formed as by-products, compounds of the formula:

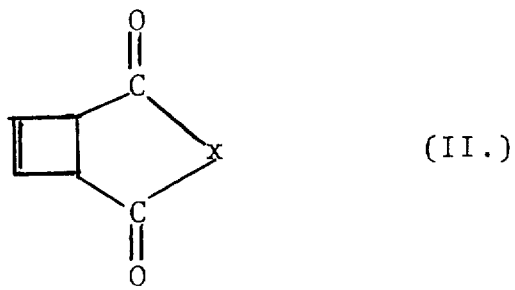

(II.)

The ratio of products of formula II to products of formula III can be adjusted by the appropriate selection of the relative proportions of reactants and by the appropriate selection of the operating temperature. Thus the proportion of compound II can be increased by decreasing the reaction temperature.

Signed and sealed this 25th day of May 1971.

(SEAL)
Attest:

EDWARD M. FLETCHER, JR.         WILLIAM E. SCHUYLER, JR.
Attesting Officer                Commissioner of Patents